(12) United States Patent
Dai et al.

(10) Patent No.: US 12,412,568 B1
(45) Date of Patent: Sep. 9, 2025

(54) INTEGRATING AN APPLICATION PROGRAMMING INTERFACE WITH A CONTACT CENTER

(71) Applicant: Zoom Communications, Inc., San Jose, CA (US)

(72) Inventors: Wei Dai, Hangzhou (CN); Maikl Adly Abdel-Malek Eskander, Seattle, WA (US); Fengcai Sun, Hangzhou (CN)

(73) Assignee: Zoom Communications, Inc., San Jose, CA (US)

( * ) Notice: Subject to any disclaimer, the term of this patent is extended or adjusted under 35 U.S.C. 154(b) by 229 days.

(21) Appl. No.: 18/321,916

(22) Filed: May 23, 2023

(51) Int. Cl.
| | |
|---|---|
| *G10L 15/18* | (2013.01) |
| *G06Q 10/1093* | (2023.01) |
| *G10L 15/22* | (2006.01) |
| *G10L 15/30* | (2013.01) |
| *H04M 3/51* | (2006.01) |

(52) U.S. Cl.
CPC ............. *G10L 15/18* (2013.01); *G10L 15/22* (2013.01); *G10L 15/30* (2013.01); *H04M 3/5183* (2013.01); *G06Q 10/1095* (2013.01); *H04M 2201/40* (2013.01)

(58) Field of Classification Search
USPC ...................................................... 704/1–504
See application file for complete search history.

(56) References Cited

U.S. PATENT DOCUMENTS

| | | | | |
|---|---|---|---|---|
| 10,725,840 B2* | 7/2020 | Lingamneni | ............ | G06F 9/547 |
| 10,764,075 B2* | 9/2020 | Uzelac | ................ | H04L 65/4038 |
| 10,839,432 B1* | 11/2020 | Konig | .................. | G06Q 30/016 |
| 11,756,543 B2* | 9/2023 | Touati | ...................... | G10L 15/22 |
| | | | | 709/224 |
| 11,775,276 B2* | 10/2023 | Touati | ...................... | G06F 8/65 |
| | | | | 717/172 |

(Continued)

OTHER PUBLICATIONS

Using ChatGPT To Interact With an API—Ponderings of an Andy, https://andrewwegner.com/chatgpt-interact-with-external-api.html, Andy Wegner, Dec. 20, 2022, 7 pages.

(Continued)

*Primary Examiner* — Marcus T Riley
(74) *Attorney, Agent, or Firm* — Young Basile Hanlon & MacFarlane, P.C.

(57) ABSTRACT

A server accesses, during a contact center engagement performed by a software agent configured to generate and output automated responses to prompts, a prompt provided by a contact center user device. The server determines, using a natural language processing engine of the software agent, to use an application programming interface call based on the prompt, the natural language processing engine comprising a generative pre-trained transformer trained to generate natural language responses to natural language prompts. The server transmits an access request representing the application programming interface call to a governance engine configured to generate data structures responsive to application programming interface calls in a format readable by the software agent. The server receives a data structure responsive to the access request from the governance engine. The server generates, using the natural language processing engine, a natural language response based on the data structure.

20 Claims, 11 Drawing Sheets

(56) References Cited

U.S. PATENT DOCUMENTS

| | | | | |
|---|---|---|---|---|
| 2004/0123307 | A1* | 6/2004 | Unger | H04Q 3/0029 |
| | | | | 379/221.06 |
| 2004/0225499 | A1* | 11/2004 | Wang | G10L 15/26 |
| | | | | 704/E15.044 |
| 2005/0234727 | A1* | 10/2005 | Chiu | G10L 15/26 |
| | | | | 704/E15.044 |
| 2010/0061534 | A1* | 3/2010 | Wang | H04M 3/4936 |
| | | | | 379/201.03 |
| 2011/0106527 | A1* | 5/2011 | Chiu | G10L 15/26 |
| | | | | 704/9 |
| 2014/0301250 | A1* | 10/2014 | Uzelac | H04L 12/1818 |
| | | | | 370/261 |
| 2020/0151038 | A1* | 5/2020 | Lingamneni | G06F 8/31 |
| 2022/0129257 | A1* | 4/2022 | Touati | G06F 16/2315 |
| 2022/0130380 | A1* | 4/2022 | Touati | G06F 8/30 |
| 2023/0259651 | A1* | 8/2023 | Chen | H04M 3/5183 |
| | | | | 726/30 |

OTHER PUBLICATIONS

Attention Is All You Need, 31st Conference on Neural Information Processing Systems (NIPS 2017), Long Beach, CA, USA., Ashish Vaswani et al., Dec. 6, 2017, 15 pages.

ZDNET, How Does ChatGPT Work? https://www.zdnet.com/article/how-does-chatgpt-work/, David Gewirtz, Mar. 10, 2023, 11 pages.

* cited by examiner

INTEGRATING AN APPLICATION PROGRAMMING INTERFACE WITH A CONTACT CENTER

FIELD

This disclosure relates to integrating an application programming interface (API) with a contact center. The contact center may be used with software services implemented over a network.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
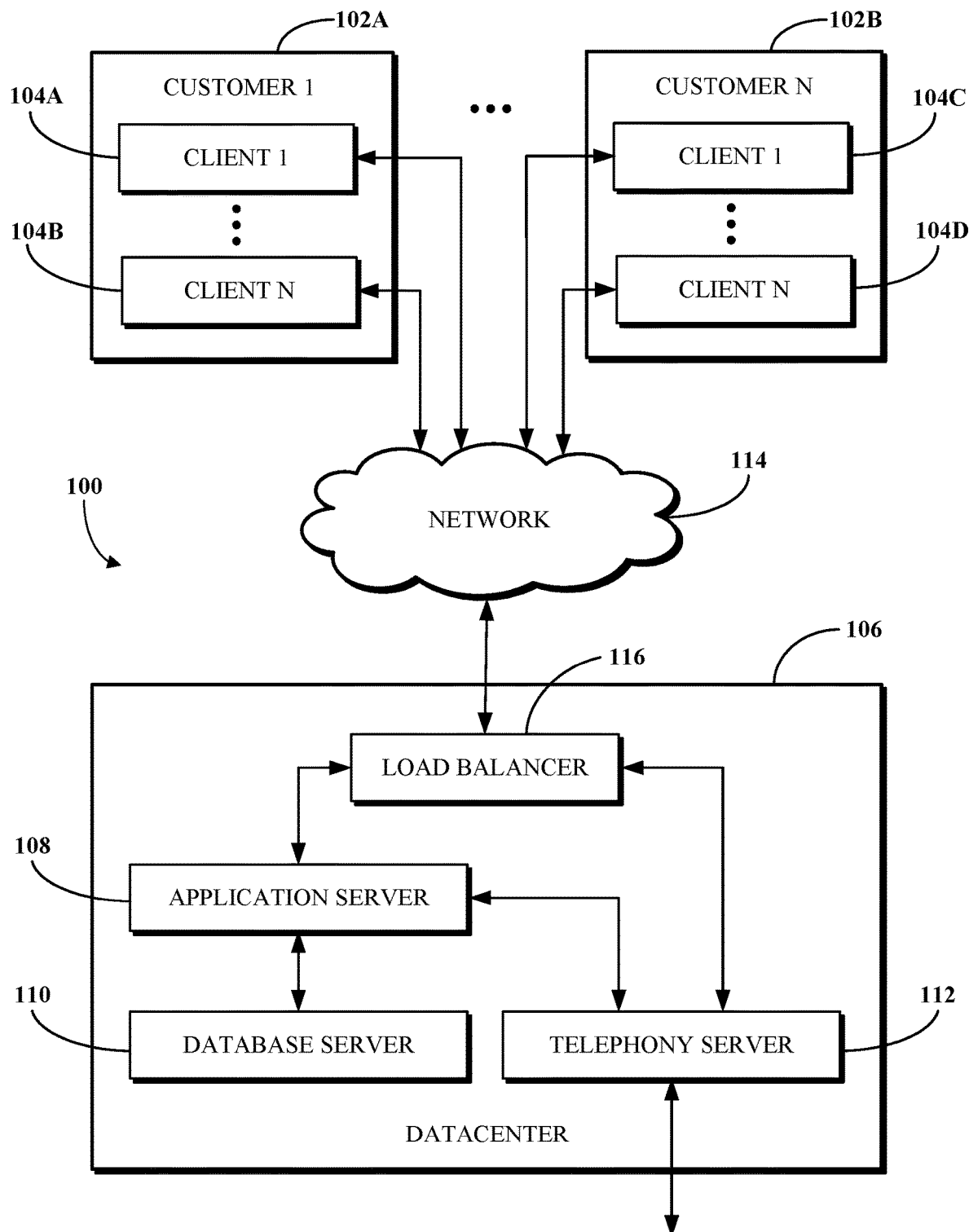
FIG. 1 is a block diagram of an example of an electronic computing and communications system.

Conferencing or telecommunications software, such as that of a Unified Communications as a Service (UCaaS) platform or a Contact Center as a Service (CCaaS) platform, generally enables contact center technology. A contact center may be used by an entity, such as a business, non-profit agency, or a government agency, to allow users to communicate with human or computer-implemented agents of the entity, for example, to ask questions or receive assistance with using the products or services of the entity. In some cases, a natural language processing (NLP) engine may be used to implement a software agent of the contact center, which may engage in natural language text or speech-based conversations with a contact center user. However, the natural language processing engine might not be integrated with data stored by the entity using the contact center (e.g., at least one of customer information, transaction history, or product information) and, therefore, might not be able to access or modify such data. Accessing or modifying such data might be useful to implement a software contact center agent. For example, in a banking context, the software contact center agent might access or modify such data to open accounts, close accounts, transfer money between accounts, or output account balances. As the foregoing illustrates, techniques for integrating a natural language processing engine with the data stored by the contact center may be desirable.

Implementations of this disclosure address problems such as these by integrating a software agent of a contact center with API calling technology that may be used to access data of the entity using the contact center. The computer-implemented contact center agent may leverage NLP technology, such as generative pre-trained transformer (GPT) technology. During a contact center engagement, a contact center user device provides a prompt. For example, a user could say, "I wish to cancel my flight." In response, the software agent determines to use an API call, for example, to determine (e.g., based on identifying information previously provided by the user) which flights the user has booked. The software agent transmits an access request representing the API call to a governance engine. The governance engine uses an API call to generate a data structure responsive to the API call (e.g., a data structure identifying the user's booked flights). The data structure is in a format that is readable by the software agent. For example, the governance engine may submit an API call to a data source, such as a database or other software or hardware, and receive a response to the API call. The governance engine generates the data structure using the response to the API call. The software agent generates a natural language response based on the data structure and transmits that natural language response to the contact center user device. For example, the software agent could output, "I see you have a flight from Detroit to Denver on January 20, and a flight from Denver to Seattle on January 25. Which flight do you wish to cancel?"

As demonstrated by the example above, in some cases, additional information (e.g., which flight the user wishes to cancel) may be requested before completing the response to the prompt. The software agent may transmit, to the contact center user device, a request for the additional information. The software agent may receive natural language data in response to the request. In some cases, the received natural language data is in a proper format for proceeding with the prompt. For example, the user could say, "Please cancel the Denver to Seattle flight of January 25." However, in some cases, the response could include an additional prompt. For example, the user could say, "I want to fly to Los Angeles on January 25." In this case, the software agent may identify, using NLP technology, that the user is creating a second prompt (book a flight to Los Angeles on January 25) and that the user likely wishes to cancel their other flight of January 25. Thus, the software agent could notify the user that the prompts will be handled serially—the cancellation will be handled first, and then the new flight will be booked. Alternatively, if the user is using a text-based chat interface to access the contact center, the two prompts could be handled in parallel, for example, in two windows (or other screen regions) for communicating with the software agent. In some case, the software agent, could determine, using NLP technology, that the user wishes to change their flight rather than to cancel it, and may confirm that this is correct with the user. For example, the software agent could output, "I understand that instead of cancelling your flight from Denver to Seattle on January 25, you would like to change to a Denver to Los Angeles flight on January 25. Is that correct?"

Some implementations allow the software agent to leverage NLP to process non-traditional responses to data requests provided to the contact center user device. For instance, in the example above, the software agent understood, "I want to fly to Los Angeles on January 25," as an additional request to book a flight to Los Angeles or a modification of the previous cancellation request to a rebooking instead of a cancellation.

As used herein, the term "engine" may include software, hardware, or a combination of software and hardware. An engine may be hard-wired into processing hardware of a machine. Alternatively, an engine may be implemented in software that is stored in memory and executed by the processing hardware. In some examples, an engine may be implemented in both software and hardware, or partially in software and partially in hardware.

As used herein, the phrase "natural language," may include a language used by humans for oral or written communication. A natural language may have evolved naturally in humans through use and repetition without conscious planning or premeditation. Natural languages may be distinguished from constructed and formal languages, such as those used to program computers. Examples of natural languages include English, Spanish, French, Chinese, Korean, and Japanese.

To describe some implementations in greater detail, reference is first made to examples of hardware and software structures used to implement an integration of an API with a contact center. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of a UCaaS platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and a telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, the client 104 or the application server 108.

The telephony server 112 enables network-based telephony and web communications from and to clients of a customer, such as the clients 104A through 104B for the customer 102A or the clients 104C through 104D for the customer 102B. Some or all of the clients 104A through 104D may be voice over internet protocol (VOIP)-enabled devices configured to send and receive calls over a network 114. In particular, the telephony server 112 includes a session initiation protocol (SIP) zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phone which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other end at a computing aspect of the customer environment. In yet another example, carrier peering may be enabled to leverage a connection of a peered carrier to the telephony server 112.

In some such implementations, a SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
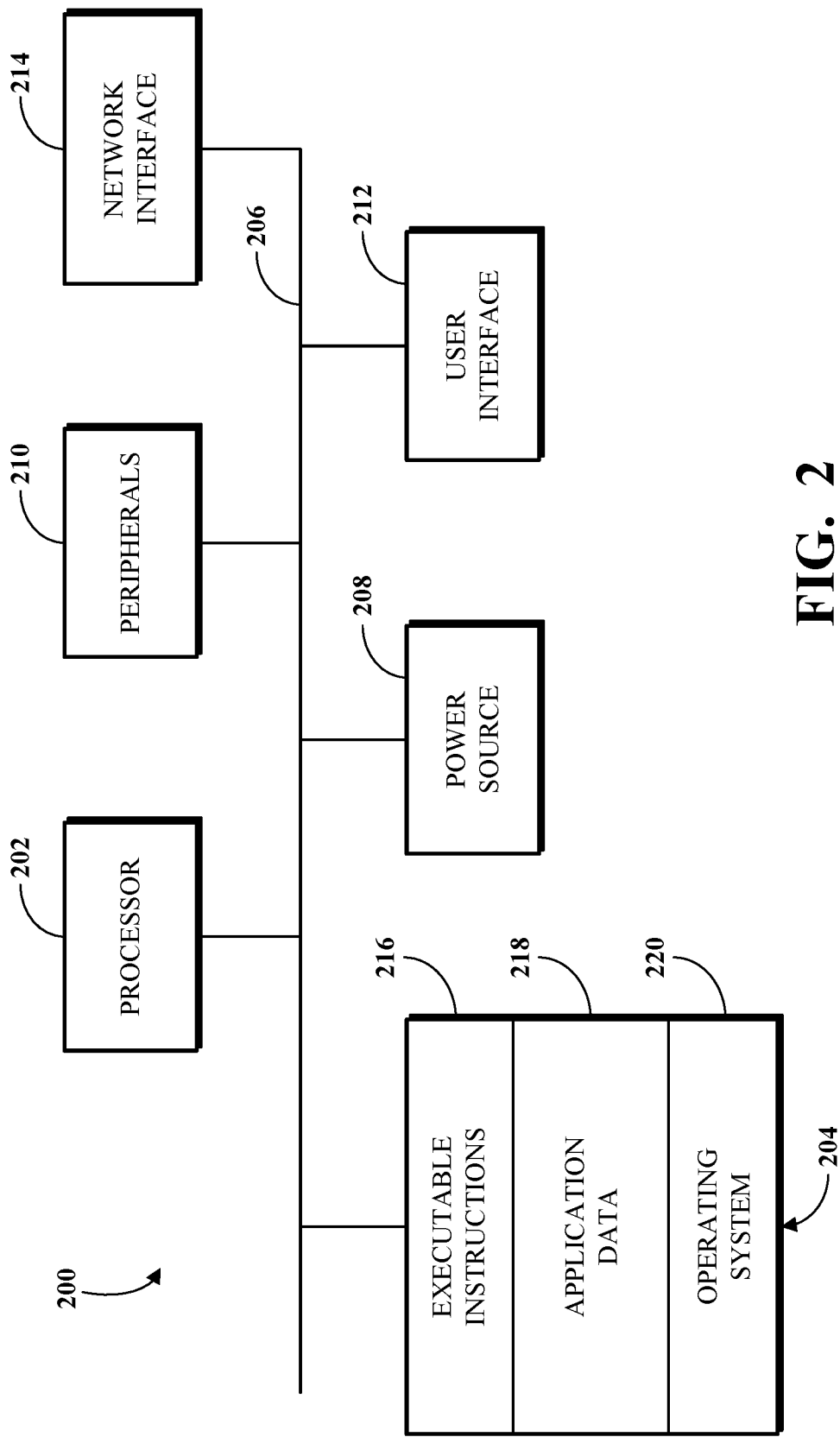
FIG. 2 is a block diagram of an example internal configuration of a computing device of an electronic computing and communications system.

FIG. 2 is a block diagram of an example internal configuration of a computing device 200 of an electronic computing and communications system. In one configuration, the computing device 200 may implement one or more of the client 104, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, configured for manipulating or processing information. For example, the processor 202 can include multiple processors interconnected in one or more manners, including hardwired or networked. The operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory can be random access memory (RAM) (e.g., a DRAM module, such as DDR SDRAM). In another example, the non-volatile memory of the memory 204 can be a disk drive, a solid state drive, flash memory, or phase-change memory. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from nonvolatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone or tablet device; or an operating system for a non-mobile device, such as a mainframe computer.

The power source 208 provides power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, or ZigBee), infrared, visible light, general packet radio service (GPRS), global system for mobile communications (GSM), code-division multiple access (CDMA), Z-Wave, another protocol, or a combination thereof.

Figure 3:
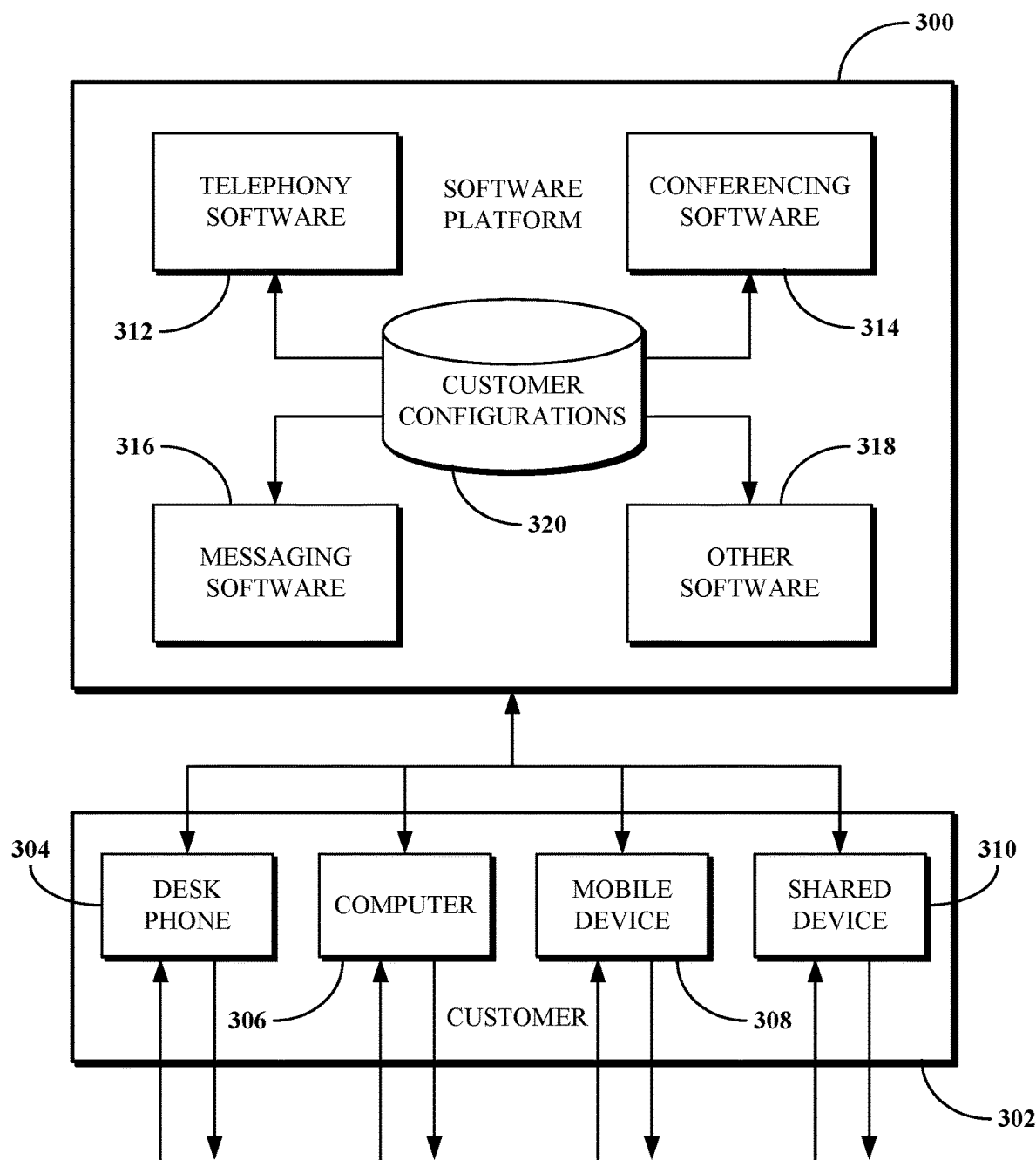
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. The software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302 as shown includes four clients-a desk phone 304, a computer 306, a mobile device 308, and a shared device 310. The desk phone 304 is a desktop unit configured to at least send and receive calls and includes an input device for receiving a telephone number or extension to dial to and an output device for outputting audio and/or video for a call in progress. The computer 306 is a desktop, laptop, or tablet computer including an input device for receiving some form of user input and an output device for outputting information in an audio and/or visual format. The mobile device 308 is a smartphone, wearable device, or other mobile computing aspect including an input device for receiving some form of user input and an output device for outputting information in an audio and/or visual format. The desk phone 304, the computer 306, and the mobile device 308 may generally be considered personal devices configured for use by a single user. The shared device 310 is a desk phone, a computer, a mobile device, or a different device which may instead be configured for use by multiple specified or unspecified users.

Each of the clients 304 through 310 includes or runs on a computing device configured to access at least a portion of the software platform 300. In some implementations, the customer 302 may include additional clients not shown. For example, the customer 302 may include multiple clients of one or more client types (e.g., multiple desk phones or multiple computers) and/or one or more clients of a client type not shown in FIG. 3 (e.g., wearable devices or televisions other than as shared devices). For example, the customer 302 may have tens or hundreds of desk phones, computers, mobile devices, and/or shared devices.

The software services of the software platform 300 generally relate to communications tools, but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may, for example, be sent or received using the desk phone 304, a softphone running on the computer 306, a mobile application running on the mobile device 308, or using the shared device 310 that includes telephony features.

The telephony software 312 further enables phones that do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or other virtual conversation between users of those devices. The unified messaging functionality of the messaging software 316 may, for example, refer to email messaging which includes a voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 can include software for integrating an API with a contact center.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some or all of the software 312 through 318 may be combined into a single software application run on clients of the customer, such as one or more of the clients 304 through 310.

Figure 4:
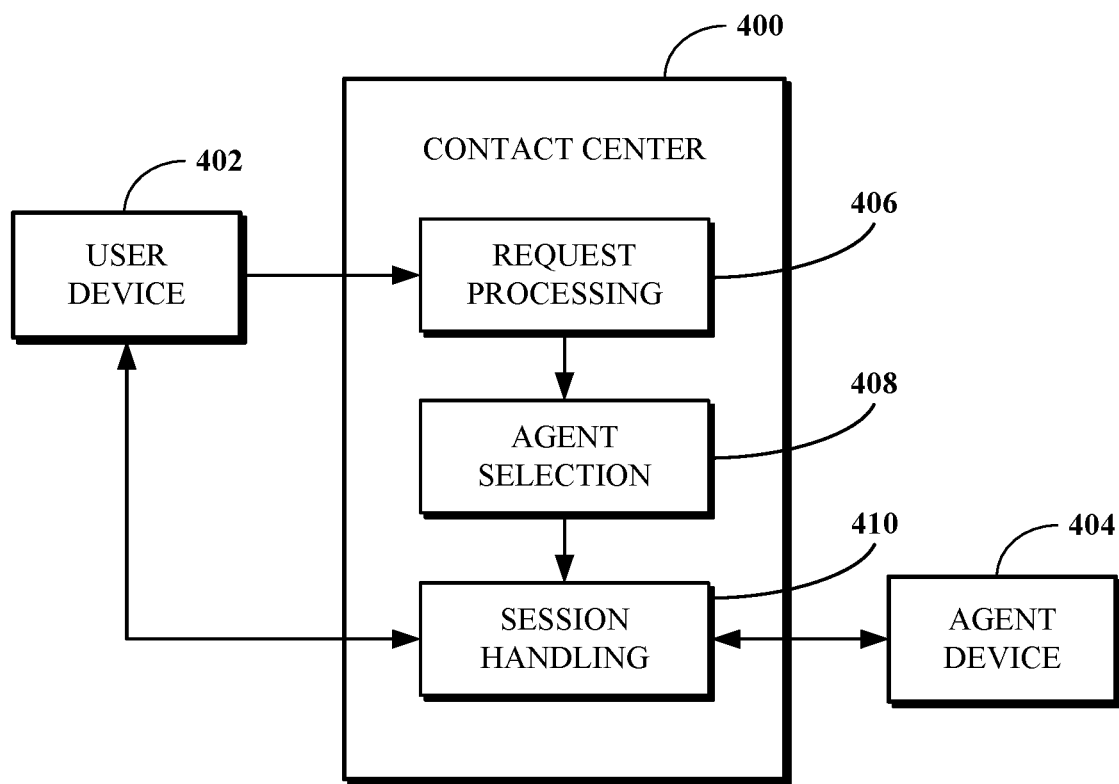
FIG. 4 is a block diagram of an example of a contact center system.

FIG. 4 is a block diagram of an example of a contact center system. A contact center 400, which in some cases may be implemented in connection with a software platform (e.g., the software platform 300 shown in FIG. 3), is accessed by a user device 402 and used to establish a connection between the user device 402 and an agent device 404 over one of multiple modalities available for use with the contact center 400, for example, telephony, video, text messaging, chat, and social media. The contact center 400 is implemented using one or more servers and software running thereon. For example, the contact center 400 may be implemented using one or more of the servers 108 through 112 shown in FIG. 1, and may use communication software such as or similar to the software 312 through 318 shown in FIG. 3. The contact center 400 includes software for facilitating contact center engagements requested by user devices such as the user device 402. As shown, the software includes request processing software 406, agent selection software 408, and session handling software 410.

The request processing software 406 processes a request for a contact center engagement initiated by the user device 402 to determine information associated with the request. The request may include a natural language query or a request entered in another manner (e.g., "press 1 to pay a bill, press 2 to request service"). The information associated with the request generally includes information identifying the purpose of the request and which is usable to direct the request traffic to a contact center agent capable of addressing the request. The information associated with the request may include information obtained from a user of the user device 402 after the request is initiated. For example, for the telephony modality, the request processing software 406 may use an interactive voice response (IVR) menu to prompt the user of the user device to present information associated with the purpose of the request, such as by identifying a category or sub-category of support requested. In another example, for the video modality, the request processing software 406 may use a form or other interactive user interface to prompt a user of the user device 402 to select options which correspond to the purpose of the request. In yet another example, for the chat modality, the request processing software 406 may ask the user of the user device 402 to summarize the purpose of the request (e.g., the natural language query) via text and thereafter process the text entered by the user device 402 using natural language processing and/or other processing.

The session handling software 410 establishes a connection between the user device 402 and the agent device 404, which is the device of the agent selected by the agent selection software 408. The particular manner of the connection and the process for establishing same may be based on the modality used for the contact center engagement requested by the user device 402. The contact center engagement is then facilitated over the established connection. For example, facilitating the contact center engagement over the established connection can include enabling the user of the user device 402 and the selected agent associated with the agent device 404 to engage in a discussion over the subject modality to address the purpose of the request from the user device 402. The facilitation of the contact center engagement over the established connection can use communication software implemented in connection with a software platform, for example, one of the software 312 through 318, or like software.

The user device 402 is a device configured to initiate a request for a contact center engagement which may be obtained and processed using the request processing software 406. In some cases, the user device 402 may be a client device, for example, one of the clients 304 through 310 shown in FIG. 3. For example, the user device 402 may use a client application running thereat to initiate the request for the contact center engagement. In another example, the connection between the user device 402 and the agent device 404 may be established using software available to a client application running at the user device 402. Alternatively, in some cases, the user device 402 may be other than a client device.

The agent device 404 is a device configured for use by a contact center agent. Where the contact center agent is a human, the agent device 404 is a device having a user interface. In some such cases, the agent device 404 may be a client device, for example, one of the clients 304 through 310, or a non-client device. In some such cases, the agent device 404 may be a server which implements software usable by one or more contact center agents to address contact center engagements requested by contact center users. Where the contact center agent is a non-human, the agent device 404 is a device that may or may not have a user interface. For example, in some such cases, the agent device 404 may be a server which implements software of or otherwise usable in connection with the contact center 400.

Although the request processing software 406, the agent selection software 408, and the session handling software 410 are shown as separate software components, in some implementations, some or all of the request processing software 406, the agent selection software 408, and the session handling software 410 may be combined. For example, the contact center 400 may be or include a single software component which performs the functionality of all of the request processing software 406, the agent selection software 408, and the session handling software 410. In some implementations, one or more of the request processing software 406, the agent selection software 408, or the session handling software 410 may be comprised of multiple software components. In some implementations, the contact center 400 may include software components other than the request processing software 406, the agent selection software 408, and the session handling software 410, such as in addition to or in place of one or more of the request processing software 406, the agent selection software 408, and the session handling software 410.

Figure 5:
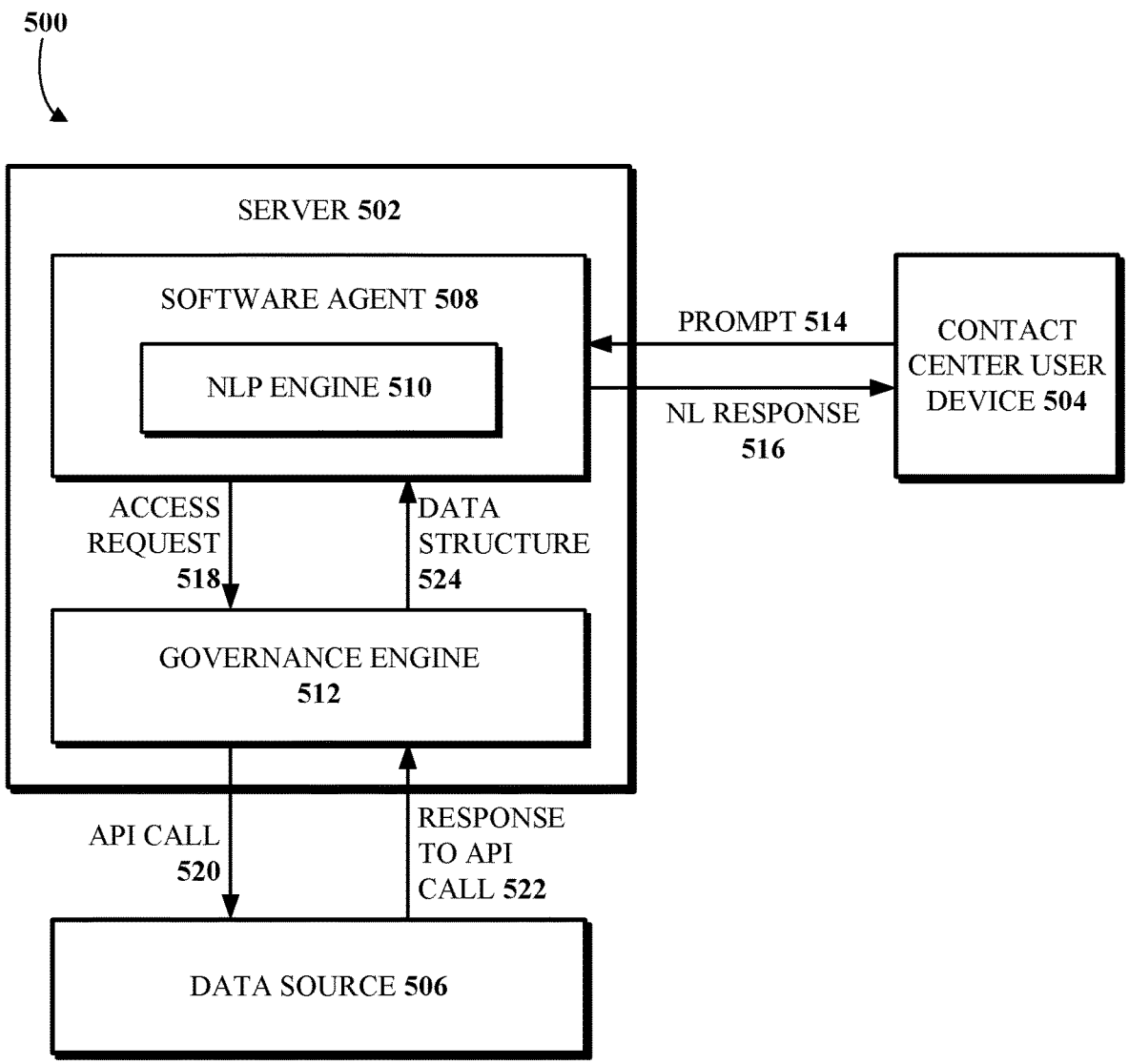
FIG. 5 is a block diagram of an example of a system for integrating an API with a contact center.

FIG. 5 is a block diagram of an example of a system 500 for integrating an API with a contact center. As shown, the system 500 includes a server 502, a contact center user device 504, and a data source 506. The server 502 may be a server used with or otherwise to implement the contact center 400. The contact center user device 504 may correspond to the user device 402. The data source 506 may be a database (or other data storage unit) of the contact center 400 or of an entity operating the contact center 400 which stores information (e.g., user account information or product information) of the contact center 400 or the entity.

As illustrated, the server 502 includes a software agent 508. The software agent 508 is configured to engage in natural language text or speech-based communication with the contact center user device 504 using an NLP engine 510 of the software agent. The NLP engine may implement GPT technology or other NLP technology. The server 502 further includes a governance engine 512 configured to make API calls to the data source 506 and to receive responses from the data source 506. A more detailed description of an example of the software agent 508 is provided in conjunction with FIG. 6. A more detailed description of an example of the governance engine 512 is provided in conjunction with FIG. 7.

In some examples of operations of the software agent 508, the software agent 508 receives a natural language prompt 514 from the contact center user device 504. The software agent 508 generates, by operation of the NLP engine 510 a natural language (NL) response 516 to the prompt 514 and transmits the natural language response 516 to the contact center user device 504.

In some cases, the software agent 508 may generate the NL response 516 based on the prompt 514 without accessing the governance engine 512 or the data source 506. For example, generating the NL response 516 might not leverage any stored data of the contact center or the entity using the contact center. For example, if a user of the contact center user device 504 accesses the contact center of a clothing retailer to inquire about what to wear to a wedding (e.g., with the prompt 514 being, "What do guests wear to formal weddings?"), the NLP engine 510 of the software agent 508 may generate the NL response 516 stating that male guests typically wear suits and female guests typically wear dresses, and that the clothing retailer typically has suits and dresses in stock. This response might be generated without accessing the governance engine 512 or the data source 506.

Alternatively, the prompt 514 might leverage data stored at the data source 506 or accessible via the governance engine 512. For example, the prompt may include the text, typed by the user of the contact center user device 504, "Which brands of suits are available at the New York City location?" In this case, the software agent 508 might determine that access to the data source 506 may be useful to generate the NL response 516. The software agent 508 transmits, to the governance engine 512, an access request 518 requesting access to a data structure listing the brands of suits in the New York City location. The governance engine 512 generates an API call 520 to the data source 506 (e.g., an inventory database) requesting a list of brands of suits in stock at the New York City location. For example, the API call may be associated with searching a database for data representing the suits that are in stock in the New York City location and obtaining the brands (e.g., stored in a column of a table of the database) of those suits. In one example, the database may include the data in Table 1.

TABLE 1

Example Inventory Database Table

| Item Type | Brand | Size | Location |
| --- | --- | --- | --- |
| Suit | ABC Brand | Small | New York City |
| Dress | DEF Brand | Small | New York City |
| Suit | DEF Brand | Medium | San Francisco |
| Suit | ABC Brand | Medium | New York City |
| Suit | ABC Brand | Large | New York City |
| Dress | GHI Brand | Large | New York City |
| Dress | GHI Brand | Medium | San Francisco |
| Suit | DEF Brand | Medium | New York City |
| Suit | DEF Brand | Small | New York City |
| Suit | GHI Brand | Medium | New York City |
| Dress | JKL Brand | Small | San Francisco |
| Suit | JKL Brand | Medium | San Francisco |

The governance engine 512 receives, from the data source 506, a response 522 to the API call. For example, the response 522 indicates the brands of suits that are available at the New York City location. The response 522 may be: {ABC Brand, ABC Brand, ABC Brand, DEF Brand, DEF Brand, GHI Brand}, which lists the brand of each suit in the New York City location, as shown in Table 1. It should be noted that the response is not deduplicated (e.g., ABC Brand and DEF Brand appear multiple times). The governance engine 512 manipulates the response 522 into a data structure 524 formatted for readability by the software agent 508 and transmits the data structure 524 to the software agent 508. For example, the governance engine may deduplicate the list in the response 522 to generate the data structure 524, which may be: {ABC Brand, DEF Brand, GHI Brand}. The software agent 508 then generates the NL response 516 based on the data structure and transmits the NL response 516 to the contact center user device 504. For example, the NL response 516 may include the text: "The following brands of suits are currently in stock in our New York City location: ABC Brand, DEF Brand, and GHI Brand."

According to some implementations, a user uses the contact center user device 504 to access a contact center of an entity via at least one of telephone, instant messaging, short message service (SMS), voice conferencing, or video conferencing. The contact center user device 504 connects with the software agent 508 at the server 502. The user provides, via the contact center user device 504, the natural language prompt 514 to the software agent 508. The software agent 508 determines, using the NLP engine 510, to use an API call based on the prompt 514. The software agent 508 transmits the access request 518 representing the API call to the governance engine 512. The governance engine 512 generates the API call 520 and obtains, from the data source 506, the response 522 to the API call 520. The governance engine 512 generates the data structure 524 representing the response 522 and provides the data structure 524 to the software agent 508. The software agent 508 uses the data structure to generate the NL response 516 to the prompt 514, and transmits the NL response 516 for display (e.g., if the NL response 516 includes text) or playback (e.g., if the NL response 516 includes audio) at the contact center user device 504.

In some cases, determining to use the API call based on the prompt 514 includes transmitting, from the software agent 508 to the contact center user device 504, a request for additional information to generate the API call. For example, if a user asks, "Are suits of my size in stock in the New York City store," the software agent 508 may determine that the user's size is to be ascertained before proceeding with the API call, and may transmit, to the contact center user device 504, a request for the user to specify their size. The software agent 508 receives, from the contact center user device 504, natural language data in response to the request. For example, the natural language data may include an audio recording of the user saying, "My size is small." The software agent 508 generates the access request based on the natural language data. For example, the access request may include a request to determine (e.g., via an inventory database) whether small sized suits are available in the New York City store.

In some cases, determining to use the API call based on the prompt 514 includes transmitting, to the contact center user device, a request for additional information to generate the API call. For example, a user could access a contact center of a bank and state, "I wish to transfer $200 to my checking account." In response, the software agent 508 may request for the user to specify the account from which the $200 is to be transferred to the checking account, prior to generating the API call to transfer the money, as both a source account and a destination account may be useful for this API call. In response to the request, the user may provide natural language speech data via the contact center user device 504. In some cases, the natural language speech data may be directly responsive to the request. For example, the user could say, "Transfer the $200 from my savings account." Alternatively, the user could say something that is not directly responsive to the request. For example, the user could say, "Also, I would like to open a business account for my small business." The NLP engine 510 of the software agent 508 recognizes the request to open the business account as a new prompt, in addition to the previously provided prompt.

In some cases, a response to the previously provided prompt may be provided before the new prompt is handled. For example, the software agent 508 could output the text or audio, "Ok. I will first handle the $200 transfer to your checking account, and then we will open the new business account for your small business. Is that ok?" The user may then approve or disapprove of the proposal. For example, the user could agree with the proposed order or propose a new order for handling the prompts.

In other cases, for example if the new prompt is an emergency or particularly valuable to an entity operating the contact center, (e.g., if the bank is interested in attracting new business customers) the new prompt may be handled before the previously provided prompt. For example, the software agent 508 could output the text or audio, "Ok. Let me get some information to open the new business account, and then we will transfer the $200 to your checking account. Is that ok?" The user may then approve or disapprove of the proposal. For example, the user could agree with the proposed order or propose a new order for handling the prompts.

In yet other cases, the new prompt may be handled in parallel with the previously provided prompt. This may be done if the user is accessing the contact center via text-based chat or another interface that allows the user to engage in two (or more) parallel activities. The new prompt and the previously provided prompt may be handled in separate display parts of a display region on the contact center user device 504 associated with the contact center engagement. Alternatively, a new display region (e.g., a new window) may be opened for handling the new prompt, and the previous prompt may be handled within the previously existing display region for the contact center engagement.

In some cases, the new display region and the previously existing display region are presented adjacent to one another on the contact center user device 504. Alternatively, the previously existing display region may partially overlay the new display region. The previously existing display region may be dominant (in a stack of display regions) over the new display region. Alternatively, the new display region may be dominant.

In yet other cases, to prevent a user of the contact center user device 504 from being overwhelmed, a user of the contact center user device 504 may be able to delegate the handling of the previously provided prompt or the new prompt to a different device or to an NLP engine operated by the user, or the user may request that the previously provided prompt or the new prompt be handled at a different time. For example, the software agent 508 could output, to the user via the contact center user device 504, "I am working on the following tasks for you. (1) Transfer $200 to checking, and (2) open new business account. Would you like to delegate another person or NLP engine to handle one or both of these tasks, or should I contact you to handle one or both of these tasks at a different time."

Figure 6:
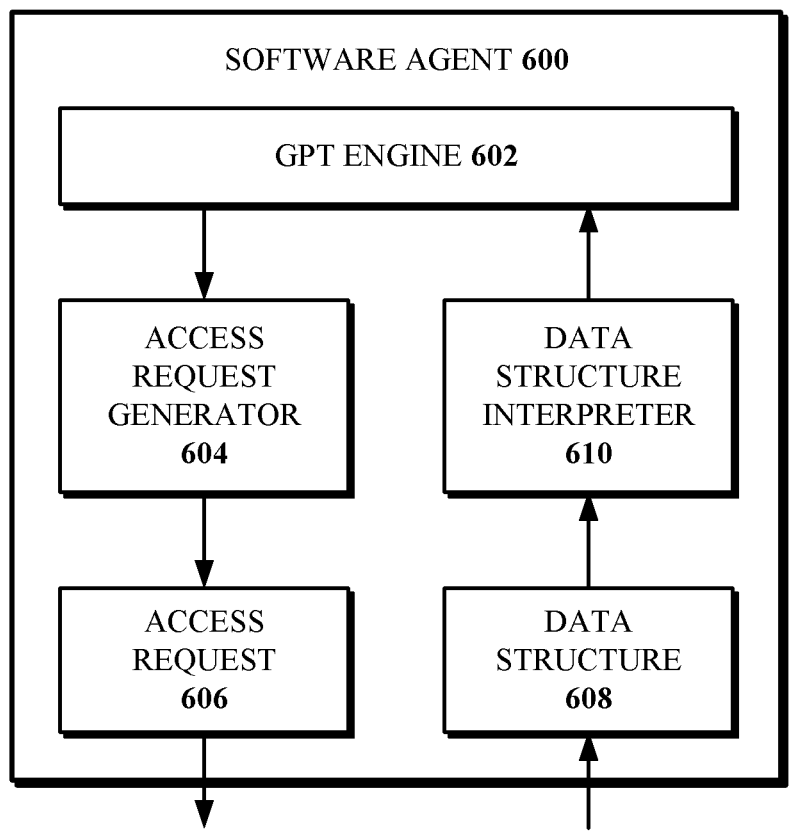
FIG. 6 is a block diagram of an example of a software agent.

FIG. 6 is a block diagram of an example of a software agent 600. The software agent 600 may correspond to the software agent 508. As shown, the software agent 600 includes a GPT engine 602. The GPT engine may correspond to the NLP engine 510. In some implementations, the GPT engine may be replaced with an NLP engine that implements technology different from GPT. The GPT engine 602 engages in text or speech-based natural language conversations with users of user devices (e.g., the user device 402 or the contact center user device 504).

The GPT engine 602 operates in conjunction with an access request generator 604. The access request generator 604 generates an access request 606 to access content (e.g., user account information or product information) of an entity operating the contact center. The access request 606 may correspond to the access request 518. For example, when the user device provides the prompt, "Which mobile phones do you have in stock that are compatible with my carrier," the GPT engine 602 determines that the GPT engine needs to identify the user's carrier and to generate a list of mobile phones that are in stock and compatible with that carrier to respond to the prompt. The access request generator 604 may generate a first access request 606 to identify the user's carrier and a second access request 606 to generate the list of mobile phones.

Each access request 606 is transmitted to a governance engine (e.g., the governance engine 512). In response to each access request 606, the software agent receives a data structure 608, from the governance engine, that includes the requested data (or an indication that the requested data is not available). For example, in response to the request to identify the user's carrier, the governance engine may determine that a carrier is not stored for the user. The data structure 608 may include an indication that no carrier is stored for the user's account. A data structure interpreter 610 may interpret this data structure to determine that GPT engine 602 is to ask the user to identify their carrier, and the GPT engine 602 may ask the user to identify their carrier. For example, the data structure interpreter 610 converts the data structure 608 into natural language text or speech for output by the GPT engine 602. In some cases, the data structure interpreter 610 may be a component of the GPT engine 602, rather than a standalone component as illustrated in FIG. 6.

After the user confirms their carrier, the access request generator 604 generates the access request 606 for the list of mobile phones that are in stock and compatible with that carrier. For example, the access request 606 may include an API call or a database access request to select, from the mobile phones in the database, the mobile phones that are in stock and compatible with the carrier. The generated data structure 608 responsive to this access request 606 may be a list (e.g., an array) of those mobile phones. The data structure interpreter 610 converts that list into a natural language response that the GPT engine 602 may provide to the user device, for example, the natural language response may be, "The following mobile phones are in stock and compatible with your carrier: ABC phone, DEF phone, and GHI phone."

The GPT engine 602 may be trained using any technique or training data for training GPT artificial intelligence technology. In some cases, the GPT engine 602 is trained, at least in part, using data of an entity using the contact center to communicate with end-users of products or services of the entity. As a result, the training data resembles the outputs to be generated by the GPT engine 602 in the real world during the inference phase.

In some cases, the GPT engine 602 is trained using a two-phase process including the phases of pre-training and fine-tuning. In the pre-training phase, the GPT engine 602 is trained on a corpus of publicly available text (e.g., from the Internet). The corpus of publicly available text may include text that is distinct from contact center engagements. For example, the corpus of publicly available text may include at least one of newspaper articles, blog posts, publicly available social media post, or encyclopedia articles. The text is used to create a language model that learns to predict the next word in a sentence given the context of the previous words. The Transformer architecture, specifically the self-attention mechanism, is used to capture dependencies between words and create a representation of the text.

During pre-training, the GPT engine 602 learns to generalize the patterns it observes in the training data. Specifically, the GPT engine 602 learns grammar, facts, reasoning abilities, and some level of world knowledge. The pre-training phase allows the GPT engine 602 to acquire a broad understanding of the natural languages in which the GPT engine 602 is trained.

During the fine-tuning phase, after pre-training, the GPT engine 602 is further fine-tuned on specific tasks (e.g., handling contact center engagements) using labeled examples. The labeled examples may include recordings or transcripts of contact center engagements which are ranked (e.g., by human reviewers) according to various qualities (e.g., politeness, empathy, or responsiveness) that are useful contact center agents. The fine-tuning phase makes the GPT engine 602 more useful for specific applications, such as serving as the software agent 600 of a contact center. Fine-tuning involves training the GPT engine 602 on a narrower dataset that may be generated with the help of human reviewers.

The fine-tuning phase includes providing prompts or instructions to the GPT engine 602 and receiving responses from the GPT engine 602. The human reviewers review the responses provided by the GPT engine 602 and score the response according to the various qualities. The GPT engine 602 uses reinforcement learning to attempt to improve its scores on each (or at least a subset) of the qualities as the fine-tuning process progresses.

Figure 7:
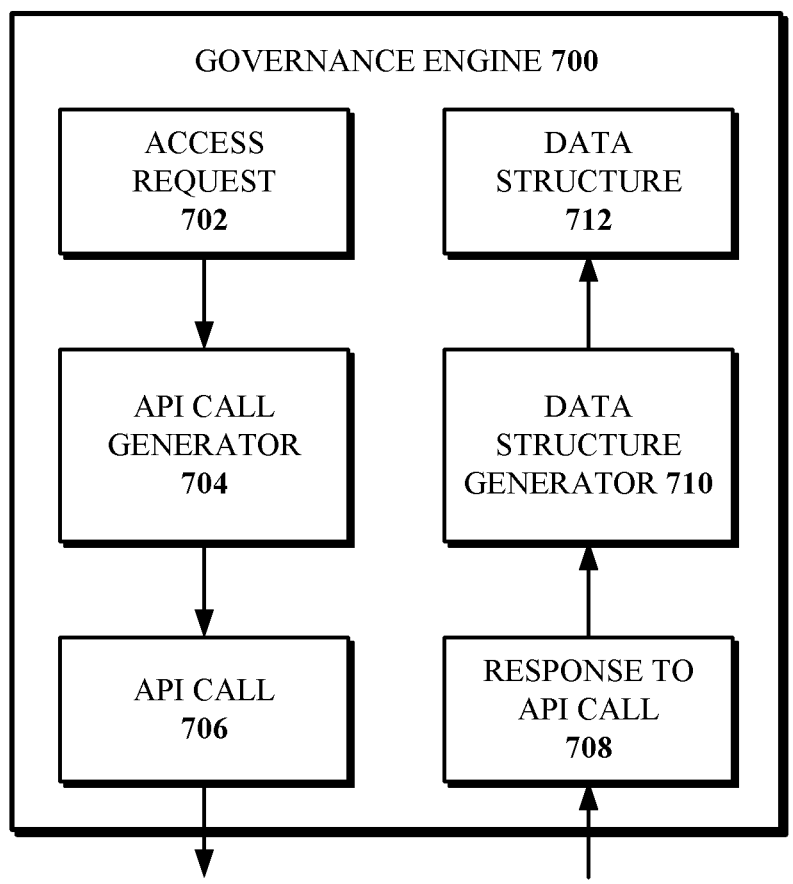
FIG. 7 is a block diagram of an example of a governance engine.

FIG. 7 is a block diagram of an example of a governance engine 700. The governance engine 700 may correspond to the governance engine 512. As shown, the governance engine 700 stores an access request 702. The access request 702 may be received from the software agent e.g., the software agent 508 or the software agent 600) and may correspond to the access request 518. An API call generator 704 of the governance engine 700 obtains the access request 702 and converts the access request 702 into an API call 706. The API call 706 may be used to request data from a data source (e.g., the data source 506) outside of the governance engine 700 and may correspond to the API call 520.

In some cases, the access request 702 specifies the data to be accessed. For example, the access request 702 may specify that a certain hotel reservation (e.g., identified by a reservation number or by an account identifier, a city, and a date of the reservation) is to be cancelled. The API call generator 704 generates the API call 706 corresponding to the access request 702. In some examples, the API call generator 704 maps data contained in the access request to the API call 706 by accessing a library of API calls and identifying an appropriate API call for the access request from the library. In some cases, if the access request 702 does not include sufficient information for generating the API call 706, (e.g., if the access request 702 is a request to cancel a hotel reservation of an account that has multiple future hotel reservations) the API call generator 704 may provide, to the software agent, an indication that more information is requested. The software agent may obtain the requested information from the contact center user device, (e.g., the contact center user device 504) and the access request 702 may be modified to include the requested information. After the access request 702 is modified, the API call generator 704 generates the API call 706.

As further illustrated in FIG. 7, the governance engine 700 receives a response 708 to the API call 706. The response 708 may correspond to the response 522. The response 708 may be received from the data source that the API call 706 was to access and may include requested information or a confirmation that a requested change to the data source (e.g., a cancellation of a hotel reservation) was made. The governance engine 700 leverages a data structure generator 710 to generate a data structure 712 that includes the information in the response 708 in a format that is readable by the software agent. The governance engine 700 transmits the data structure 712 to the software agent. The data structure 712 may correspond to the data structure 524.

In some cases, the response 708 is a confirmation. In this case, the data structure 712 may be a confirmation that the access request 702 was fulfilled. For example, the data structure 712 may be a Boolean value that is True if the access request 702 was fulfilled and False if the access request 702 was not fulfilled (e.g., due to technical issues (e.g., network accessibility issues) of the data source).

In some cases, the access request 702 includes a request to read data. For example, a customer of a bank may access a contact center of the bank and request their account balance. In this case, the response 708 would include the balance of the account. The data structure 712 generated by the data structure generator 710 may indicate both the account (e.g., checking) and the balance (e.g., $123.45) in a format that is readable by the software agent (or by an NLP engine (e.g., the NLP engine 510) of the software agent). For example, the string of text "checking $123.45" may be interpretable by the NLP engine as generating that the balance of the checking account is $123.45. In some cases, the data structure generator 710 generates the data structure to be a text string including "<requested data identifier><value>, <requested data identifier><value>..." For example, if a user telephones a bank's contact center and requests the balances of all of their accounts, the data structure 712, generated by the data structure generator 710, could be the text string: "checking $123.45, savings $678.90, money market $345.67". The NLP engine of the software agent could read this text string and output the audio: "The balance of your checking account is $123.45; the balance of your savings account is $678.90; and the balance of your money market account is $345.67."

Figure 8A:
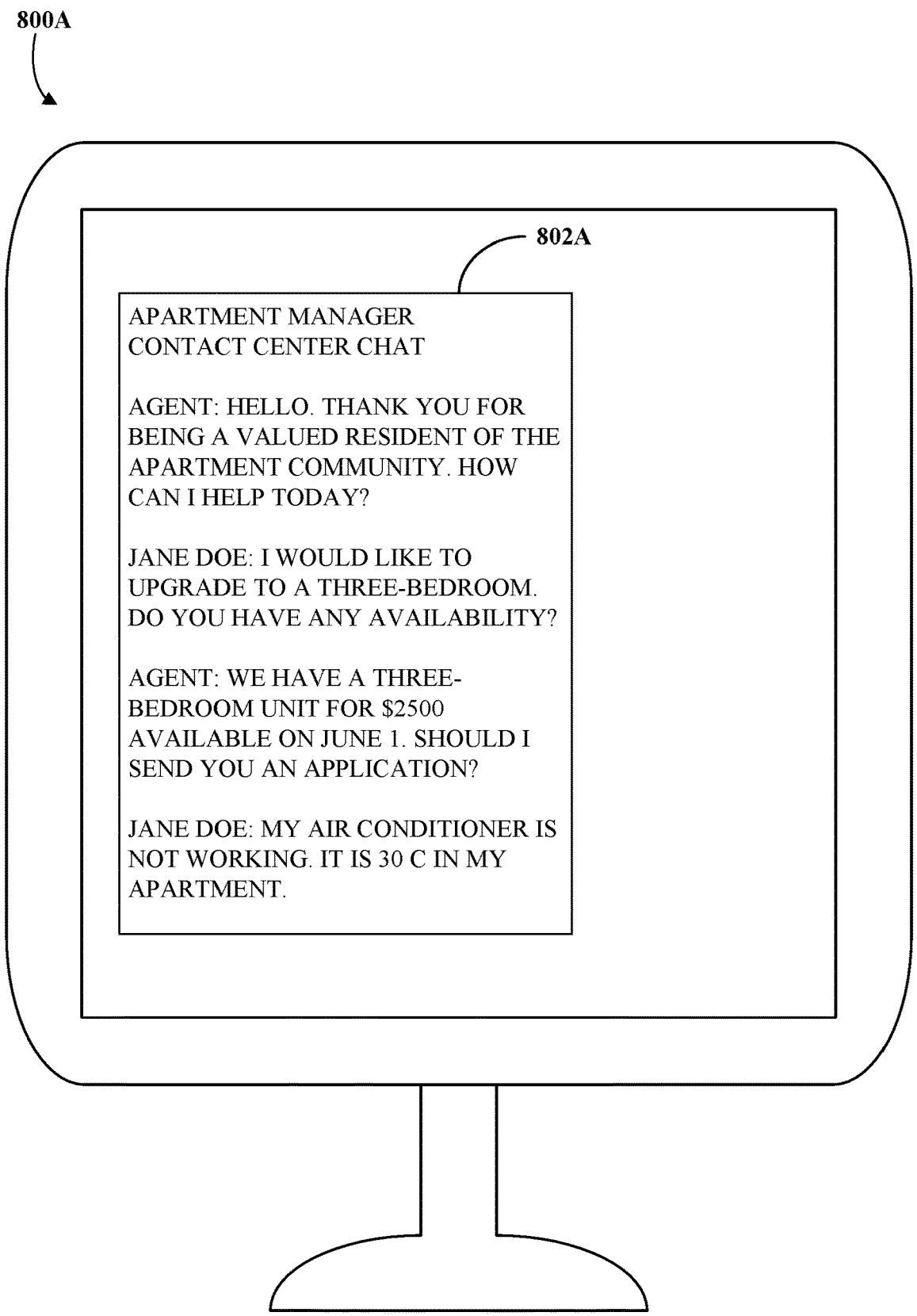
FIGS. 8A-8B illustrate example graphical user interfaces (GUIs) for a contact center engagement.
Figure 8B:
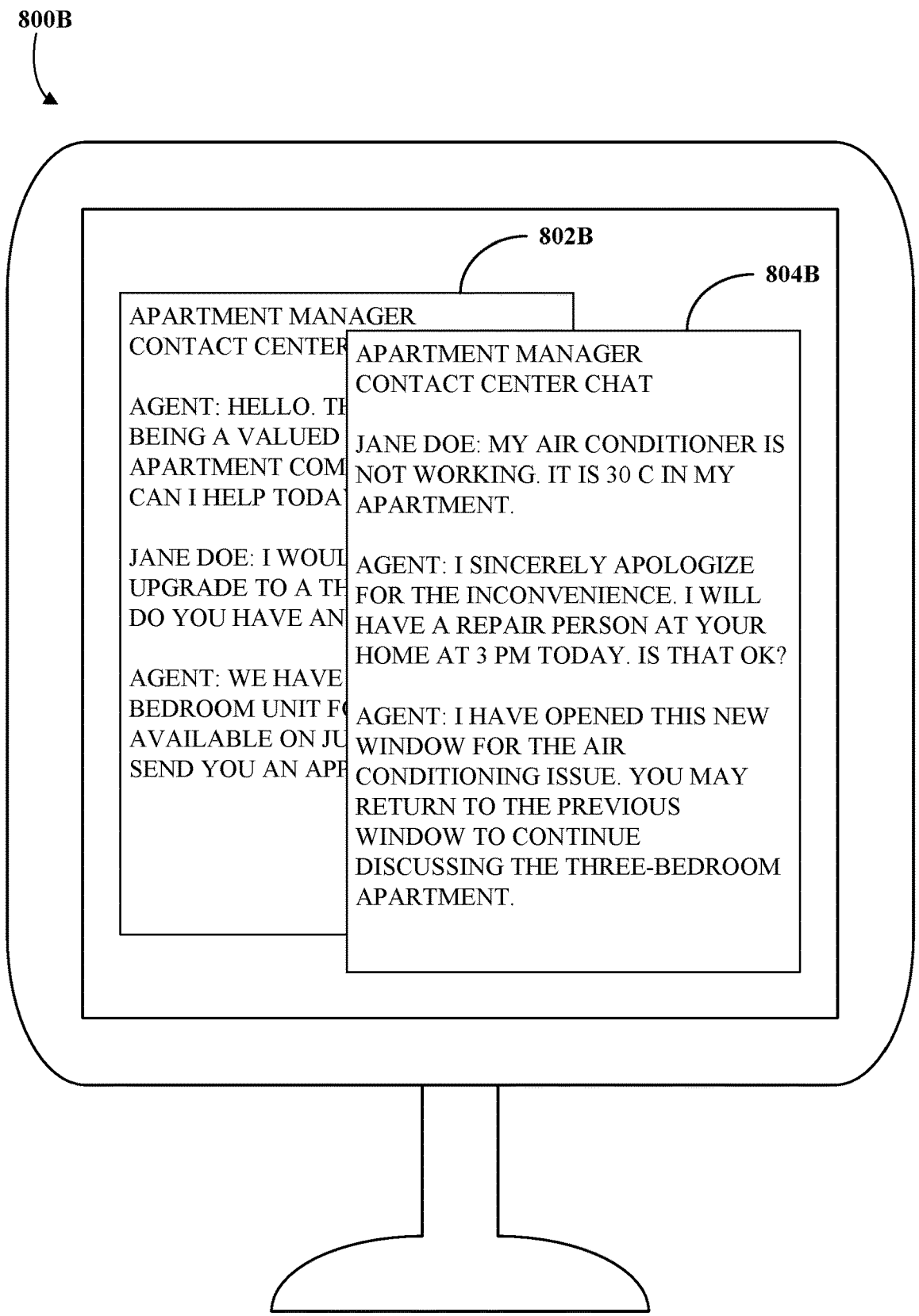

FIGS. 8A-8B illustrate example GUIs 800A and 800B for a contact center engagement. The GUIs 800A and 800B may be presented (e.g., output for display) at a contact center user device (e.g., the contact center user device 504).

As shown in FIG. 8A, the GUI 800A includes a first window 802A for a text chat between a user (Jane Doe) and an agent of a contact center of an apartment manager. The agent may be a software agent (e.g., the software agent 508 or the software agent 600). As illustrated in the first window 802A, the agent begins the text chat with a greeting ("Hello. Thank you for being a valued resident of the apartment community. How can I help today?"). The greeting may be set by the entity operating the contact center. The user begins by asking for an upgrade to a three-bedroom apartment. After the agent outputs a response, the user states that their air conditioner is not working.

The agent determines, using NLP techniques as described above, that the air conditioning not working represents a new prompt, separate and distinct from the previous prompt about the availability of the three-bedroom apartment. The agent determines, using software, that the prompt about the air conditioning is more urgent than the prompt about the three-bedroom apartment. The determination that the air conditioning prompt is more urgent may be determined using a NLP engine (e.g., the NLP engine 510) that is trained to identify urgency of requests. The urgency may be a function of a time when the user will benefit from the request being fulfilled (e.g., the air conditioning is causing immediate discomfort, while it would take some time for the user to move to the three-bedroom apartment from their current unit) and an acceptability level of the status quo (e.g., the user may be physically uncomfortable due to the lack of air conditioning, but the unit in which they currently reside is otherwise acceptable). In some cases, the level of urgency is determined using an artificial neural network (ANN) that is trained to identify levels of urgency of prompts. The ANN may be trained using supervised learning applied to a dataset including other prompts that were provided to the contact center and the level of urgency of which was manually determined by human reviewers.

Based on the determination that the air conditioning prompt is more urgent than the three-bedroom apartment prompt, the software of the agent determines to process the air conditioning prompt first. Thus, the software of the agent causes presentation of the GUI 800B at the contact center user device.

The GUI 800B includes the window 802B, which corresponds to the window 802A but does not include the user's last prompt about the air conditioning. The GUI 800B includes a new window 804B to which the prompt about the air conditioning has been moved. As shown, the window 804B includes a response, by the agent, to the prompt. The window 804B also includes a statement that the window 804B was created for processing the air conditioning prompt, and that the other window 802B remains for processing the three-bedroom apartment prompt. The user may continue discussing the air conditioning in the window 804B or may switch to the window 802B to continue discussing the three-bedroom apartment.

It should be noted that the window 804B is the dominant window in the GUI 800B and is positioned above (e.g., partially obscuring) the window 802B (and any other potentially open windows) in a stack of windows. The window 804B, rather than the window 802B, was made the dominant window in response to a determination that the prompt (regarding air conditioning) being processed in the window 804B is more urgent than the prompt (regarding the three-bedroom apartment) being processed in the window 802B.

In alternative implementations, the window 802B may be the dominant window in the GUI 800B. This may occur, for example, if the user had stated something less urgent than the first prompt (regarding the three-bedroom apartment) in the second prompt. For example, if the second prompt was statement that the potato chips in the vending machine need to be restocked, the discussion of the potato chips could have occurred in the window 804B, which would have been placed beneath the window 802B. In this case, the window 802B would have been the dominant window, and would have partially obscured the window 804B.

As described above, the urgency of the prompt was considered in determining whether the window 802B or the window 804B should be the dominant window. In other implementations, other factors (e.g., how valuable the prompt is to the user or to the entity operating the contact center) could also be considered in determining which window is to be the dominant window. Furthermore, the user could easily switch windows if the user wishes to work on one prompt before the other. For example, if the user wishes to discuss the three-bedroom apartment and not the air conditioning, they could switch to the window 802B, rendering that window 802B the dominant window.

In addition, as a result of the separate windows 802B, 804B being created for the separate prompts, the user can work with the agent to process both prompts in parallel. For example, the user could switch between chatting about the three-bedroom apartment and about the air conditioner, in order to arrange the move to the three-bedroom apartment and the repair of the air conditioner in the same contact center engagement session.

Figure 9:
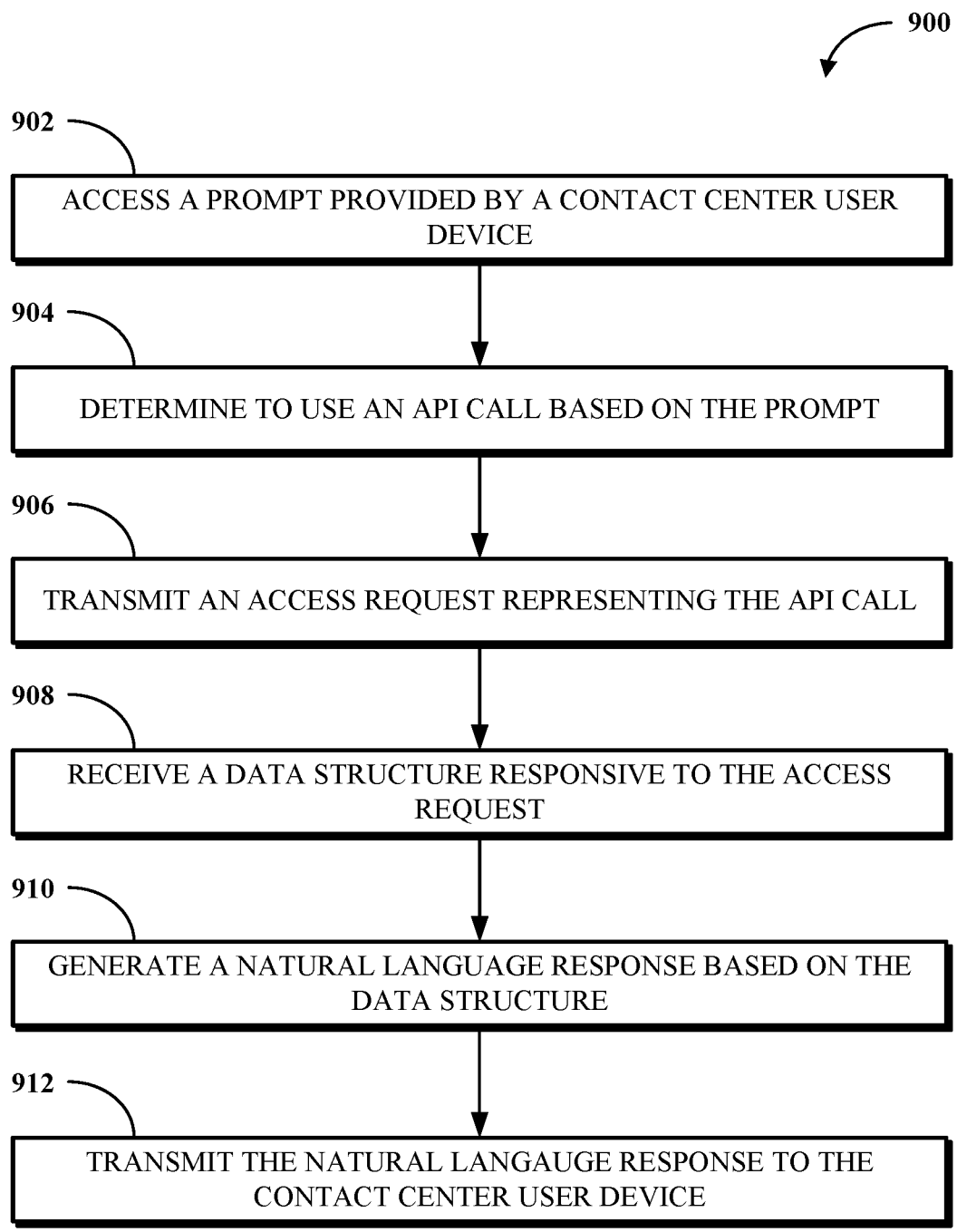
FIG. 9 is a flowchart of an example of a technique for responding to a prompt using an application programming interface call.
Figure 10:
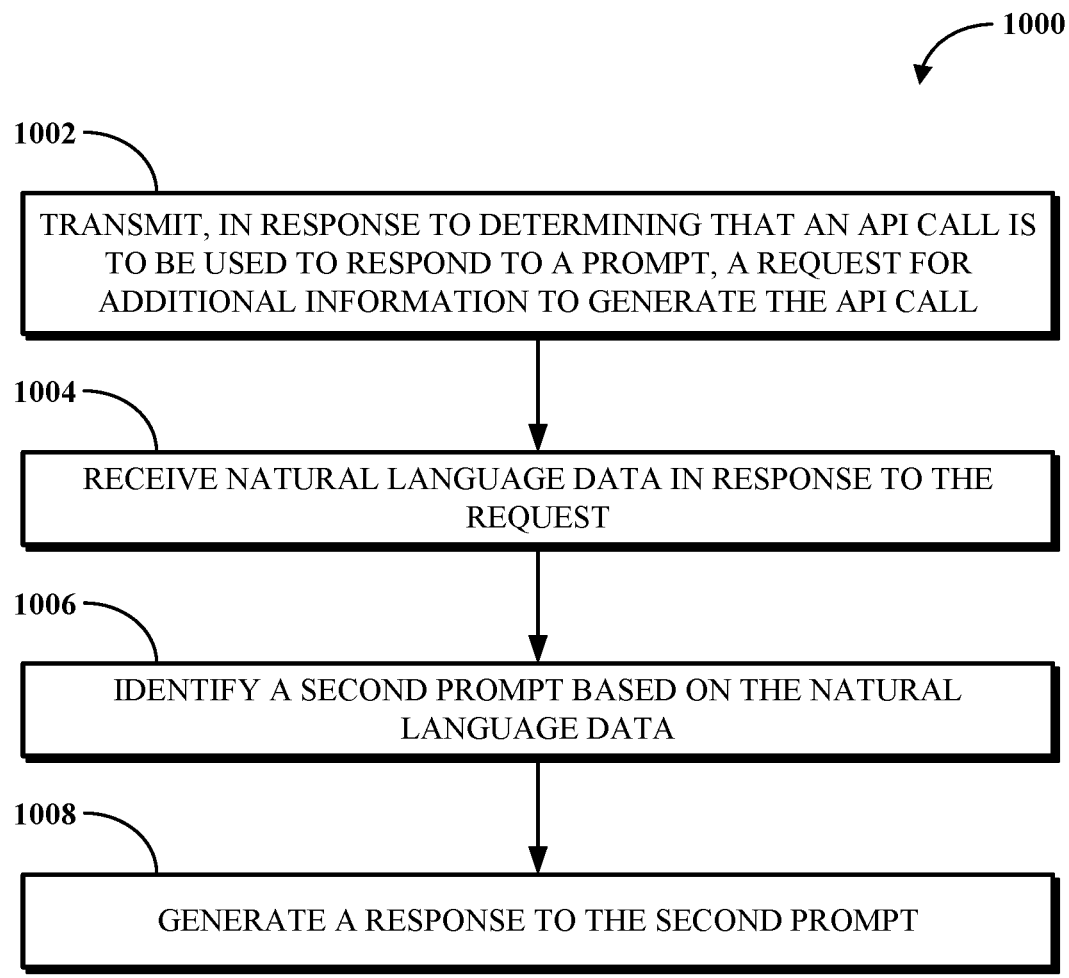
FIG. 10 is a flowchart of an example of a technique for processing a request for additional information.

To further describe some implementations in greater detail, reference is next made to examples of techniques which may be performed by integrating an API calling interface with a contact center. FIG. 9 is a flowchart of an example of a technique 900 for responding to a prompt using an API call. FIG. 10 is a flowchart of an example of a technique 1000 for processing a request for additional information. The techniques 900 and 1000 can be executed using computing devices, such as the systems, hardware, and software described with respect to FIGS. 1-8. The techniques 900, 1000 can be performed, for example, by executing a machine-readable program or other computer-executable instructions, such as routines, instructions, programs, or other code. The steps, or operations, of the techniques 900, 1000 or another technique, method, process, or algorithm described in connection with the implementations disclosed herein can be implemented directly in hardware, firmware, software executed by hardware, circuitry, or a combination thereof.

For simplicity of explanation, the techniques 900, 1000 are depicted and described herein as series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

FIG. 9 illustrates an example of the technique 900 for responding to a prompt using an API call. The technique 900 may be performed by one or more servers (e.g., the server 502) of a contact center (e.g., the contact center 400).

At 902, the server accesses, during a contact center engagement performed by a software agent (e.g., the software agent 508) configured to generate and output automated responses to prompts provided during the contact center engagement over one or more communication modalities, a prompt (e.g., the prompt 514) provided by a contact center user device (e.g., the contact center user device 504). The prompt may be spoken or typed by the user of the contact center user device. The prompt may be accessed by the software agent at the server.

At 904, the server determines, using a NLP engine (e.g., the NLP engine 510) of the software agent, to use an API call based on the prompt. The NLP engine includes a GPT trained to generate natural language responses to natural language prompts. The API call may include a retrieval of data from a data repository. The data may include at least one of user information, a user account status, a user transaction history, product information, or real-time data (e.g., real-time weather data, stock prices, or currency exchange rates). The API call may include processing a payment or verifying a user identity. The API call may include creating a support ticket. The API call may include scheduling an appointment.

In one example use case, a user located in the United States accesses a contact center of a hotel chain to book a hotel room in France. During the contact center engagement, the user asks the software agent to provide the United States Dollar-Euro exchange rate. An API call may be leveraged, using the techniques disclosed herein, to determine the current Dollar-Euro exchange rate and to output that rate to the user. At a later point during the contact center engagement, the user may confirm that they wish to pay for the hotel room in France. Another API call may be performed, using the process described herein, to process the user's payment.

At 906, the software agent transmits an access request (e.g., the access request 518) representing the API call to a governance engine (e.g., the governance engine 512) configured to generate data structures responsive to application programming interface calls in a format readable by the software agent. The governance engine may reside at the same server as the software agent, for example, as illustrated in FIG. 5. Alternatively, the governance engine may reside at a different server from the server storing the software agent. For example, the software agent may be a GPT-based agent of the contact center that is shared by multiple entities using the contact center. The governance engine may be specific to a specific entity. For example, a banking entity called ABC Bank may have a different governance engine from a hotel chain entity called DEF Hotels. The software agent may reside at a server of the contact center. The governance engine of ABC Bank may reside at a server of ABC Bank, which is different from the server of the contact center. The governance engine of DEF Hotels may reside at a server of DEF Hotels, which is different from the server of the contact center, and which is different from the server of ABC Bank.

At 908, the software agent receives a data structure (e.g., the data structure 524) responsive to the access request from the governance engine. In some implementations, the governance engine generates the API call (e.g., the API call 520) and receives a response (e.g., the response 522) to the API call. The data structure represents the response to the application programming interface call in a format that is readable by the software agent. The format that is readable by the software agent may include a string with at least one word in a natural language.

At 910, the software agent generates, using the NLP engine, a natural language response (e.g., the NL response 516) based on the data structure. The natural language response may include describing the information contained in the data structure using words in the natural language.

At 912, the software agent transmits the natural language response to the contact center user device. The natural language response is then output at the user device. For example, if the natural language response includes audio, the natural language response is played at the contact center user device. If the natural language response includes text, the natural language response is displayed at the contact center user device.

FIG. 10 illustrates an example of the technique 1000 for processing a request for additional information. The technique 1000 may be performed by one or more servers (e.g., the server 502) of a contact center (e.g., the contact center 400).

At 1002, in response to determining that an API call is to be used to respond to a prompt provided during a contact center engagement (e.g., at 904, as described above), the server transmits a request for additional information to generate the API call. For example, in a contact center engagement with a car dealership, an API call may be used to schedule a service appointment for a user's car. The server may use the API call to provide several appointment times to the user, and to have the user select one of the appointment times. For example, the server could output audio stating: "Service appointments are available on Monday at 8:00 AM, Tuesday at 9:00 AM, or Wednesday at 10:00 AM. Which of these times do you prefer?" This audio may be outputted using the API call that selects available service appointment times and allows the user to book one of the available appointment times.

At 1004, the server receives natural language data in response to the request. The natural language data may be received from a user device (e.g., the contact center user device 504) and may include text typed by a user of the user device or speech spoken by a user of the user device. For example, the user could say, "I will come in on Tuesday at 9:00 AM, and I also want to buy a second car."

At 1006, the server identifies a second prompt based on the received natural language data. In the above example, the server uses NLP or GPT technology to parse the user's statement into two parts: "I will come in on Tuesday at 9:00 AM," is understood as being responsive to the service appointment scheduling request, and "I also want to buy a second car," is understood as the second prompt.

At 1008, the server generates a response to the second prompt. The response to the second prompt may include, for example, providing the user with a list of cars available for sale at the car dealership or scheduling an appointment for the user to meet with a sales advisor. In some cases, information obtained from responding to the first prompt may be used to handle the second prompt more effectively. For example, an appointment for the user to view and test drive cars for sale at the car dealership may be made for the user on Tuesday at 9:00 AM, while they are waiting for their current car to be serviced.

Some implementations are described below as numbered examples (Example 1, 2, 3, etc.). These examples are provided as examples only and do not limit the other implementations disclosed herein.

Example 1 is a method, comprising: accessing, during a contact center engagement performed by a software agent configured to generate and output automated responses to prompts provided over one or more communication modalities, a prompt provided by a contact center user device; determining, using a natural language processing engine of the software agent, to use an application programming interface call based on the prompt, the natural language processing engine comprising a generative pre-trained transformer trained to generate natural language responses to natural language prompts; transmitting an access request representing the application programming interface call to a governance engine configured to generate data structures responsive to application programming interface calls in a format readable by the software agent; receiving a data structure responsive to the access request from the governance engine; generating, using the natural language processing engine, a natural language response based on the data structure; and transmitting the natural language response to the contact center user device.

In Example 2, the subject matter of Example 1 includes, wherein determining to use the application programming interface call based on the prompt comprises: transmitting, to the contact center user device, a request for additional information to generate the application programming interface call; receiving, from the contact center user device, natural language data in response to the request; and generating the access request using the natural language data.

In Example 3, the subject matter of Examples 1-2 includes, wherein determining to use the application programming interface call based on the prompt comprises: transmitting, to the contact center user device, a request for additional information to generate the application programming interface call; receiving, from the contact center user device, natural language data in response to the request; identifying a second prompt based on the natural language data; and generating, by the software agent, a response to the second prompt in parallel with generating the natural language response to the prompt.

In Example 4, the subject matter of Examples 1-3 includes, wherein determining to use the application programming interface call based on the prompt comprises: transmitting, to the contact center user device, a request for additional information to generate the application programming interface call; receiving, from the contact center user device, natural language data in response to the request; identifying a second prompt based on the natural language data; and generating, by the software agent, a response to the second prompt after transmitting the natural language response to the contact center user device.

In Example 5, the subject matter of Examples 1-4 includes, wherein the governance engine generates the application programming interface call and receives a response to the application programming interface call, wherein the data structure represents the response to the application programming interface call in a format that is readable by the software agent.

In Example 6, the subject matter of Examples 1-5 includes, wherein the application programming interface call comprises a retrieval of data from a data repository, wherein the data comprises at least one of user information, a user account status, a user transaction history, product information, or real-time data.

In Example 7, the subject matter of Examples 1-6 includes, wherein the application programming interface call comprise processing a payment or verifying a user identity.

In Example 8, the subject matter of Examples 1-7 includes, wherein the application programming interface call comprises creating a support ticket.

In Example 9, the subject matter of Examples 1-8 includes, wherein the application programming interface call comprises scheduling an appointment.

In Example 10, the subject matter of Examples 1-9 includes, wherein the generative pre-trained transformer is trained, at least in part, using data of an entity using the contact center.

Example 11 is a non-transitory computer readable medium storing instructions operable to cause one or more processors to perform operations comprising: accessing, during a contact center engagement performed by a software agent configured to generate and output automated responses to prompts provided over one or more communication modalities, a prompt provided by a contact center user device; determining, using a natural language processing engine of the software agent, to use an application programming interface call based on the prompt, the natural language processing engine comprising a generative pre-trained transformer trained to generate natural language responses to natural language prompts; transmitting an access request representing the application programming interface call to a governance engine configured to generate data structures responsive to application programming interface calls in a format readable by the software agent; receiving a data structure responsive to the access request from the governance engine; generating, using the natural language processing engine, a natural language response based on the data structure; and transmitting the natural language response to the contact center user device.

In Example 12, the subject matter of Example 11 includes, wherein determining to use the application programming interface call based on the prompt comprises: transmitting, to the contact center user device, a request for information to generate the application programming interface call; receiving, from the contact center user device, natural language text or natural language speech in response to the request; and generating the access request using the natural language text or the natural language speech.

In Example 13, the subject matter of Examples 1-12 includes, wherein determining to use the application programming interface call based on the prompt comprises: transmitting, to the contact center user device, a request for information to generate the application programming interface call; receiving, from the contact center user device, natural language text in response to the request; identifying a second prompt based on the natural language text; and generating, by the software agent, a response to the second prompt in parallel with generating the natural language response to the prompt.

In Example 14, the subject matter of Examples 1-13 includes, wherein determining to use the application programming interface call based on the prompt comprises: transmitting, to the contact center user device, a request for information to generate the application programming interface call; receiving, from the contact center user device, natural language text in response to the request; identifying a second prompt based on the natural language text; and generating, by the software agent, a response to the second prompt after transmitting the natural language response to the contact center user device.

In Example 15, the subject matter of Examples 1-14 includes, wherein the governance engine generates the application programming interface call and receives a response to the application programming interface call, wherein the data structure represents the response to the application programming interface call.

In Example 16, the subject matter of Examples 1-15 includes, wherein the application programming interface call comprises a retrieval of data from a data repository, wherein the data comprises at least one of a user account status, a user transaction history, product information, or real-time data.

In Example 17, the subject matter of Examples 1-16 includes, wherein the application programming interface call comprise processing a payment.

In Example 18, the subject matter of Examples 1-17 includes, wherein the application programming interface call comprises booking an appointment.

In Example 19, the subject matter of Examples 1-18 includes, wherein the generative pre-trained transformer is trained, at least in part, using data of an entity using the contact center to communicate with end-users of products or services of the entity.

Example 20 is an apparatus comprising: a memory; and a processor configured to execute instructions stored in the memory to: access, during a contact center engagement performed by a software agent configured to generate and output automated responses to prompts provided over one or more communication modalities, a prompt provided by a contact center user device; determine, using a natural language processing engine of the software agent, to use an application programming interface call based on the prompt, the natural language processing engine comprising a generative pre-trained transformer trained to generate natural language responses to natural language prompts; transmit an access request representing the application programming interface call to a governance engine configured to generate data structures responsive to application programming interface calls in a format readable by the software agent; receive a data structure responsive to the access request from the governance engine; generate, using the natural language processing engine, a natural language response based on the data structure; and transmit the natural language response to the contact center user device.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:
   accessing, during an engagement with a contact center performed by a software agent configured to generate and output automated responses to prompts provided over one or more communication modalities, a prompt provided by a contact center user device;
   determining, using a natural language processing engine of the software agent, to use an application programming interface call based on the prompt, the natural language processing engine comprising a generative pre-trained transformer trained to generate natural language responses to natural language prompts;
   transmitting an access request representing the application programming interface call to a governance engine configured to generate data structures responsive to application programming interface calls in a format readable by the software agent;
   receiving a data structure responsive to the access request from the governance engine;
   generating, using the natural language processing engine, a natural language response based on the data structure; and
   transmitting the natural language response to the contact center user device.

2. The method of claim 1, wherein determining to use the application programming interface call based on the prompt comprises:
   transmitting, to the contact center user device, a request for additional information to generate the application programming interface call;

receiving, from the contact center user device, natural language data in response to the request; and generating the access request using the natural language data.

3. The method of claim 1, wherein determining to use the application programming interface call based on the prompt comprises:

transmitting, to the contact center user device, a request for additional information to generate the application programming interface call;

receiving, from the contact center user device, natural language data in response to the request;

identifying a second prompt based on the natural language data; and generating, by the software agent, a response to the second prompt in parallel with generating the natural language response to the prompt.

4. The method of claim 1, wherein determining to use the application programming interface call based on the prompt comprises:

transmitting, to the contact center user device, a request for additional information to generate the application programming interface call;

receiving, from the contact center user device, natural language data in response to the request;

identifying a second prompt based on the natural language data; and generating, by the software agent, a response to the second prompt after transmitting the natural language response to the contact center user device.

5. The method of claim 1, wherein the governance engine generates the application programming interface call and receives a response to the application programming interface call, wherein the data structure represents the response to the application programming interface call in a format that is readable by the software agent.

6. The method of claim 1, wherein the application programming interface call comprises a retrieval of data from a data repository, wherein the data comprises at least one of user information, a user account status, a user transaction history, product information, or real-time data.

7. The method of claim 1, wherein the application programming interface call comprises processing a payment or verifying a user identity.

8. The method of claim 1, wherein the application programming interface call comprises creating a support ticket.

9. The method of claim 1, wherein the application programming interface call comprises scheduling an appointment.

10. The method of claim 1, wherein the generative pre-trained transformer is trained, at least in part, using data of an entity using the contact center engagement.

11. A non-transitory computer-readable medium storing instructions operable to cause one or more processors to perform operations comprising:

accessing, during an engagement with a contact center performed by a software agent configured to generate and output automated responses to prompts provided during the engagement over one or more communication modalities, a prompt provided by a contact center user device;

determining, using a natural language processing engine of the software agent, to use an application programming interface call based on the prompt, the natural language processing engine comprising a generative pre-trained transformer trained to generate natural language responses to natural language prompts;

transmitting an access request representing the application programming interface call to a governance engine configured to generate data structures responsive to application programming interface calls in a format readable by the software agent;

receiving a data structure responsive to the access request from the governance engine;

generating, using the natural language processing engine, a natural language response based on the data structure; and transmitting the natural language response to the contact center user device.

12. The non-transitory computer-readable medium of claim 11, wherein determining to use the application programming interface call based on the prompt comprises:

transmitting, to the contact center user device, a request for information to generate the application programming interface call;

receiving, from the contact center user device, natural language text or natural language speech in response to the request; and generating the access request using the natural language text or the natural language speech.

13. The non-transitory computer-readable medium of claim 11, wherein determining to use the application programming interface call based on the prompt comprises:

transmitting, to the contact center user device, a request for information to generate the application programming interface call;

receiving, from the contact center user device, natural language text in response to the request;

identifying a second prompt based on the natural language text; and generating, by the software agent, a response to the second prompt in parallel with generating the natural language response to the prompt.

14. The non-transitory computer-readable medium of claim 11, wherein determining to use the application programming interface call based on the prompt comprises:

transmitting, to the contact center user device, a request for information to generate the application programming interface call;

receiving, from the contact center user device, natural language text in response to the request;

identifying a second prompt based on the natural language text; and generating, by the software agent, a response to the second prompt after transmitting the natural language response to the contact center user device.

15. The non-transitory computer-readable medium of claim 11, wherein the governance engine generates the application programming interface call and receives a response to the application programming interface call, wherein the data structure represents the response to the application programming interface call.

16. The non-transitory computer-readable medium of claim 11, wherein the application programming interface call comprises a retrieval of data from a data repository, wherein the data comprises at least one of a user account status, a user transaction history, product information, or real-time data.

17. The non-transitory computer-readable medium of claim 11, wherein the application programming interface call comprises processing a payment.

18. The non-transitory computer-readable medium of claim 11, wherein the application programming interface call comprises booking an appointment.

19. The non-transitory computer-readable medium of claim 11, wherein the generative pre-trained transformer is trained, at least in part, using data of an entity using the contact center to communicate with end-users of products or services of the entity.

20. An apparatus comprising:
a memory; and
a processor configured to execute instructions stored in the memory to:
access, during an engagement with a contact center performed by a software agent configured to generate and output automated responses to prompts provided during the engagement over one or more communication modalities, a prompt provided by a contact center user device;
determine, using a natural language processing engine of the software agent, to use an application programming interface call based on the prompt, the natural language processing engine comprising a generative pre-trained transformer trained to generate natural language responses to natural language prompts;
transmit an access request representing the application programming interface call to a governance engine configured to generate data structures responsive to application programming interface calls in a format readable by the software agent;
receive a data structure responsive to the access request from the governance engine;
generate, using the natural language processing engine, a natural language response based on the data structure; and
transmit the natural language response to the contact center user device.

\* \* \* \* \*